United States Patent
Komatsubara

(10) Patent No.: US 9,267,738 B2
(45) Date of Patent: Feb. 23, 2016

(54) RIGID AND ELASTIC MOUNTING FOR VEHICLE HEAT EXCHANGER

(75) Inventor: Yusuke Komatsubara, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 590 days.

(21) Appl. No.: 13/297,651

(22) Filed: Nov. 16, 2011

(65) Prior Publication Data
US 2012/0132396 A1   May 31, 2012

(30) Foreign Application Priority Data
Nov. 29, 2010   (JP) .................. 2010-264936

(51) Int. Cl.
| | | |
|---|---|---|
| B60H 1/00 | (2006.01) | |
| F28D 1/053 | (2006.01) | |
| F28F 9/00 | (2006.01) | |
| F28D 21/00 | (2006.01) | |

(52) U.S. Cl.
CPC ........ F28D 1/05391 (2013.01); B60H 1/00521 (2013.01); F28F 9/001 (2013.01); *B60H 2001/00635* (2013.01); *F28D 2021/0085* (2013.01); *F28F 2265/30* (2013.01)

(58) Field of Classification Search
CPC ............... B60H 1/00521; B60H 2001/00635; F28F 9/001; F28F 2265/30; F28D 1/05391; F28D 2010/0085
USPC ............. 165/41, 69, 76, 78, 79, 80.1, 81, 82, 165/149, 151, 173; 62/295, 466; 248/560, 248/632, 633
See application file for complete search history.

(56) References Cited

U.S. PATENT DOCUMENTS

| | | | | | |
|---|---|---|---|---|---|
| 3,775,972 | A | * | 12/1973 | Perpall ............................ | 60/599 |
| 4,328,859 | A | * | 5/1982 | Bouvot ............................ | 165/78 |
| 4,914,929 | A | * | 4/1990 | Shimazaki ...................... | 62/515 |
| 6,601,639 | B2 | * | 8/2003 | Shibata ........................... | 165/42 |
| 6,772,824 | B1 | * | 8/2004 | Tsuruta ........................... | 165/41 |
| 7,640,971 | B2 | * | 1/2010 | Kolb ............................... | 165/149 |

FOREIGN PATENT DOCUMENTS

JP   11-78506   3/1999

* cited by examiner

*Primary Examiner* — Travis Ruby
(74) *Attorney, Agent, or Firm* — Harness, Dickey & Pierce, P.L.C.

(57) ABSTRACT

An air conditioning system for a vehicle includes a heat exchanger, a case clamping an outer peripheral part of the heat exchanger in its thickness direction, and an elastic body disposed at the outer peripheral part of the heat exchanger between the case and the heat exchange. The opposite side of the exchanger is held directly by the case. The elastic body is compressively deformed between the case and the heat exchanger to clamp the heat exchanger. A region of the outer peripheral part of the exchanger includes a planar portion at least on one side of the exchanger. The case includes an air stop rib at a position of the case opposed to the planar portion in the thickness direction of the exchanger. The air stop rib is located adjacent to the planar portion to limit an air leak.

21 Claims, 6 Drawing Sheets

RIGID AND ELASTIC MOUNTING FOR VEHICLE HEAT EXCHANGER

CROSS REFERENCE TO RELATED APPLICATION

This application is based on and incorporates herein by reference Japanese Patent Application No. 2010-264936 filed on Nov. 29, 2010.

BACKGROUND OF THE INVENTION

1. Field of the Invention

The present invention relates to an air conditioning system for a vehicle that holds a heat exchanger inside a case.

2. Description of Related Art

In such an air conditioning system for a vehicle, as described in JP-A-H11-078506, for example, a heat exchanger is held with the heat exchanger sandwiched in a case in a thickness direction of the heat exchanger. An elastic body is disposed between the heat exchanger and the case, and the elastic body is arranged on the generally entire outer peripheral part of the heat exchanger.

The purposes of the use of the elastic body as described above are as follows.

Firstly, an air leak between the heat exchanger and the case is limited so as to pass the air reliably through a heat exchanging core part, and heat exchanging performance is thereby ensured.

Secondly, vibration transmission from the heat exchanger to the case is alleviated, so that development of an abnormal noise is limited.

Thirdly, by reliably holding the heat exchanger inside the case, a backlash of the heat exchanger is prevented.

To fulfill these purposes, it is desirable that the elastic body should be disposed along the whole region of the outer peripheral part of the heat exchanger. However, in this case, the large amount of the elastic body used results in increase of a production cost. If use of the elastic body per se is given up for the reduction of the production cost, the above purposes cannot be achieved.

SUMMARY OF THE INVENTION

The present invention addresses at least one of the above disadvantages.

According to the present invention, there is provided an air conditioning system for a vehicle, including a heat exchanger, a case, and an elastic body. The case clamps and holds an outer peripheral part of the heat exchanger at least in a thickness direction of the heat exchanger. The elastic body is disposed at a part of the outer peripheral part of the heat exchanger between the case and the heat exchange on one side of the heat exchanger in the thickness direction of the heat exchanger. The other side of the heat exchanger in the thickness direction of the heat exchanger is held directly by the case. The elastic body is compressively deformed by a stress, with which the case clamps the outer peripheral part of the heat exchanger. A region of the outer peripheral part of the heat exchanger except the part of the outer peripheral part of the heat exchanger includes a planar portion at least on one of both sides of the heat exchanger in the thickness direction of the heat exchanger. The case includes a proximity portion at a position of the case opposed to the planar portion in the thickness direction of the heat exchanger. The proximity portion is located adjacent to the planar portion to limit an air leak.

According to the present invention, there is also provided an air conditioning system for a vehicle, including a heat exchanger, a case, an elastic body, and a rigid member. The case clamps and holds an outer peripheral part of the heat exchanger at least in a thickness direction of the heat exchanger. The elastic body is disposed at a part of the outer peripheral part of the heat exchanger between the case and the heat exchanger on one side of the heat exchanger in the thickness direction of the heat exchanger. The rigid member is disposed inside the case to directly hold the other side of the heat exchanger in the thickness direction of the heat exchanger, and is not compressively deformed by a stress, with which the case clamps the outer peripheral part of the heat exchanger. The elastic body is compressively deformed by the stress. A region of the outer peripheral part of the heat exchanger except the part of the outer peripheral part of the heat exchanger includes a planar portion at least on one of both sides of the heat exchanger in the thickness direction of the heat exchanger. The case includes a proximity portion at a position of the case opposed to the planar portion in the thickness direction of the heat exchanger. The proximity portion is located adjacent to the planar portion to limit an air leak.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
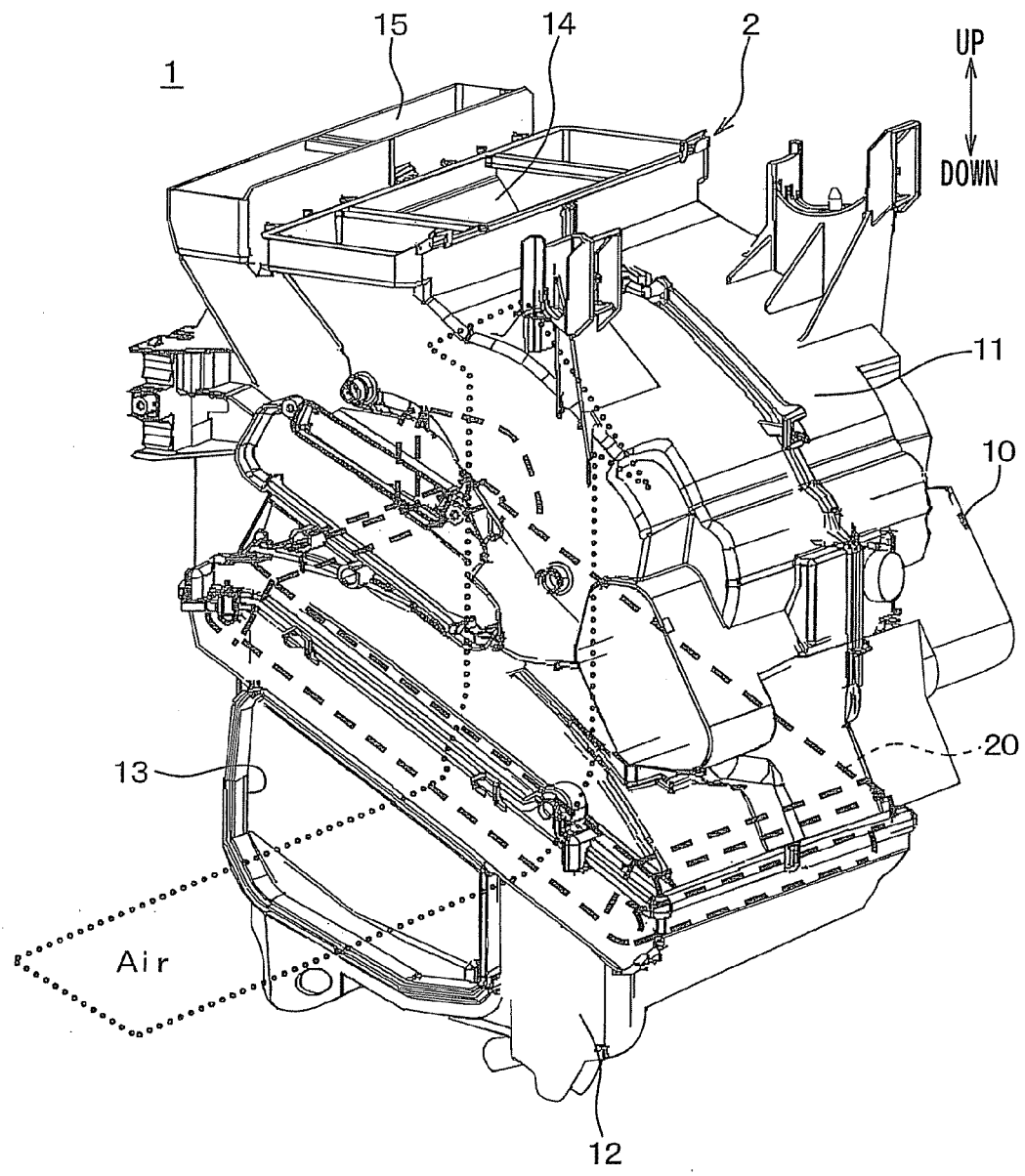
FIG. 1 is a perspective view illustrating an air conditioning unit of an air conditioning system for a vehicle in accordance with a first embodiment of the invention.

Embodiments of the invention are described below with reference to the accompanying drawings. The same numerals are used in the drawings to indicate the same or equivalent parts in the following embodiments for the purpose of the simplification of the description.

(First Embodiment)

An air conditioning system for a vehicle in accordance with a first embodiment of the invention includes an air conditioning unit 1 disposed inside an instrument panel at a frontmost part of a vehicle interior. The air conditioning unit 1 includes a blower unit (not shown) that accommodates a blower, and a heat exchanger unit 2 (FIG. 1) that accommodates a heat exchanger. The blower unit and the heat exchanger unit 2 are arranged side by side in a right-left direction of the vehicle.

As illustrated in FIG. 1, the heat exchanger unit 2 holds an evaporator 20 inside a unit case 10.

Figure 2:
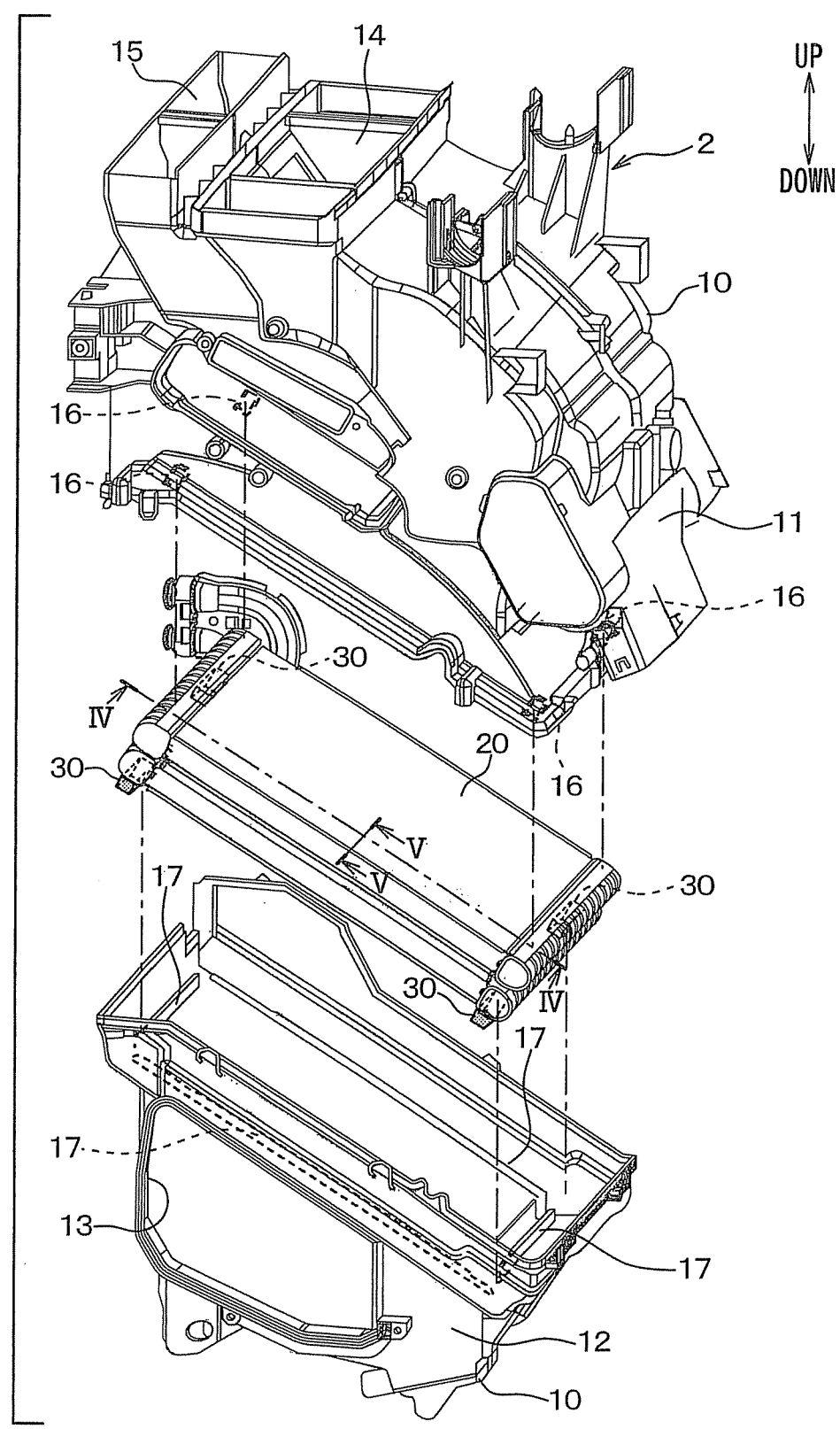
FIG. 2 is an exploded perspective view illustrating the air conditioning unit in FIG. 1.

The unit case 10 defines an air passage for air blown into the vehicle interior, and is formed from resin having such strength as to not compressively deform by stress applied at the time of its attachment. As illustrated in FIG. 2, the unit case 10 is divided between a first case 11 on its upper side and a second case 12 on its lower side at a region at which to hold the evaporator 20.

The evaporator 20 is a heat exchanger for cooling that cools blowing air through the exchange of heat between refrigerant flowing through the evaporator 20 and air blown from the blower unit. The evaporator 20 constitutes a refrigeration cycle together with, for example, a compressor, condenser, and expansion valve, which are not shown.

Figure 3:
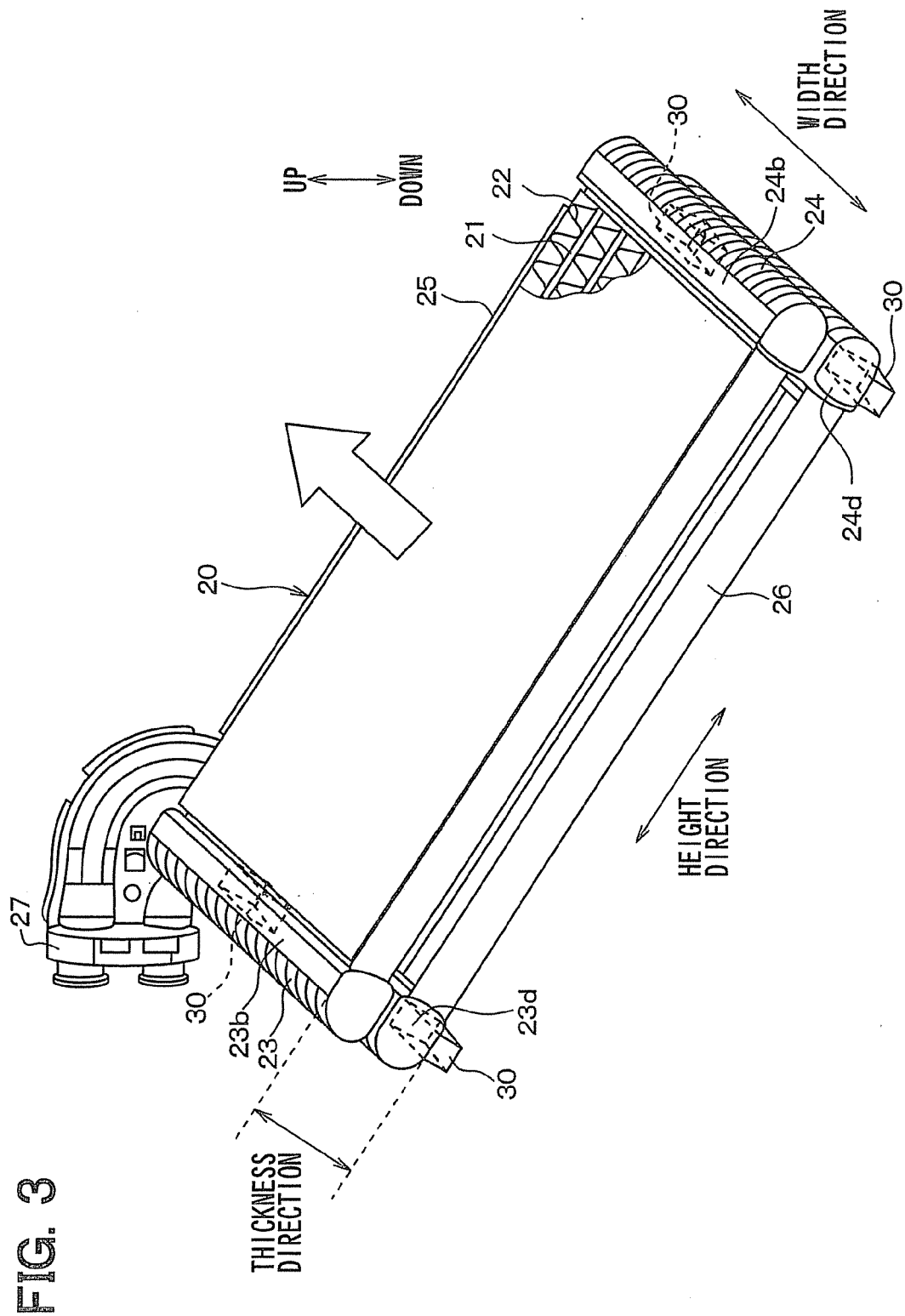
FIG. 3 is a perspective view illustrating an evaporator in FIG. 2.

As illustrated in FIG. 3, the evaporator 20 includes flat tubes 21 that constitute a refrigerant passage, a corrugated fin 22 that is joined between these tubes 21, tank parts 23, 24 which are disposed at both ends of the tubes 21 in their longitudinal direction and through which the refrigerant passages of the tubes 21 communicate with each other, side plates 25, 26 that are located on both sides of the evaporator 20 in a stacking direction of the tubes 21, and a connecting portion 27 that connects the evaporator 20 and a refrigerant piping. A heat exchanging core part is constituted of the tubes 21 and the corrugated fin 22. The members that constitute the evaporator 20 are formed from a metal material, which is excellent in heat conduction, such as aluminum. By means of integrally brazing of these members, for example, the evaporator 20 is formed.

As illustrated in FIGS. 1 to 3, a heat exchange surface of the evaporator 20 is inclined relative to the horizontal plane by a predetermined minute angle, such that the other tank part 24 is located on a lower side than the one tank part 23 in a state in which the evaporator 20 is held by the unit case 10. The heat exchange surface is a surface of the evaporator 20 through which the blowing air flows in and out.

In the following description, as illustrated in FIG. 3, the longitudinal direction of the tube 21 is referred to as a height direction of the evaporator 20; longitudinal directions of the tank parts 23, 24 are referred to as a width direction of the evaporator 20; and a direction that is perpendicular to both the height direction and width direction is referred to as a thickness direction of the evaporator 20. The thickness direction of the evaporator 20 is a flow direction of air passing through the evaporator 20, and is also a direction perpendicular to the heat exchange surface.

As illustrated in FIG. 1, a connection port 13 that is connected to the blower unit is formed on a lower side wall of the unit case 10. In the heat exchanger unit 2, as indicated by an arrow in FIG. 1, the blowing air out of the blower unit, which has flowed into the case 10 through the connection port 13, passes through the evaporator 20 from the lower to upper side. Then, the air flows toward openings 14, 15 communicating respectively with air outlets through the interior of the unit case 10.

Inside the unit case 10, a heater core (not shown) is disposed on a downstream side of the evaporator 20 in the air flow direction, and a sliding-type air mixing door having a shape of a plate is disposed slidably in a vehicle front-back direction between the evaporator 20 and the heater core. This sliding-type air mixing door is a temperature adjusting means for adjusting temperature of the air blown out into the vehicle interior through the adjustment of an air volume rate between warm air after passing through the heater core and cold air bypassing the heater core.

In the unit case 10, air outlet mode switch doors (not shown) that switch between opening and closing of the openings 14, 15 are provided on an upstream side of the openings 14, 15 communicating respectively with air outlets. As a result of the control of the air mixing door and air outlet mode switch door, conditioned air having a desired temperature is blown out into the vehicle interior through a selected air outlet.

A structure for holding the evaporator 20 in the unit case 10 will be described.

Figure 4:
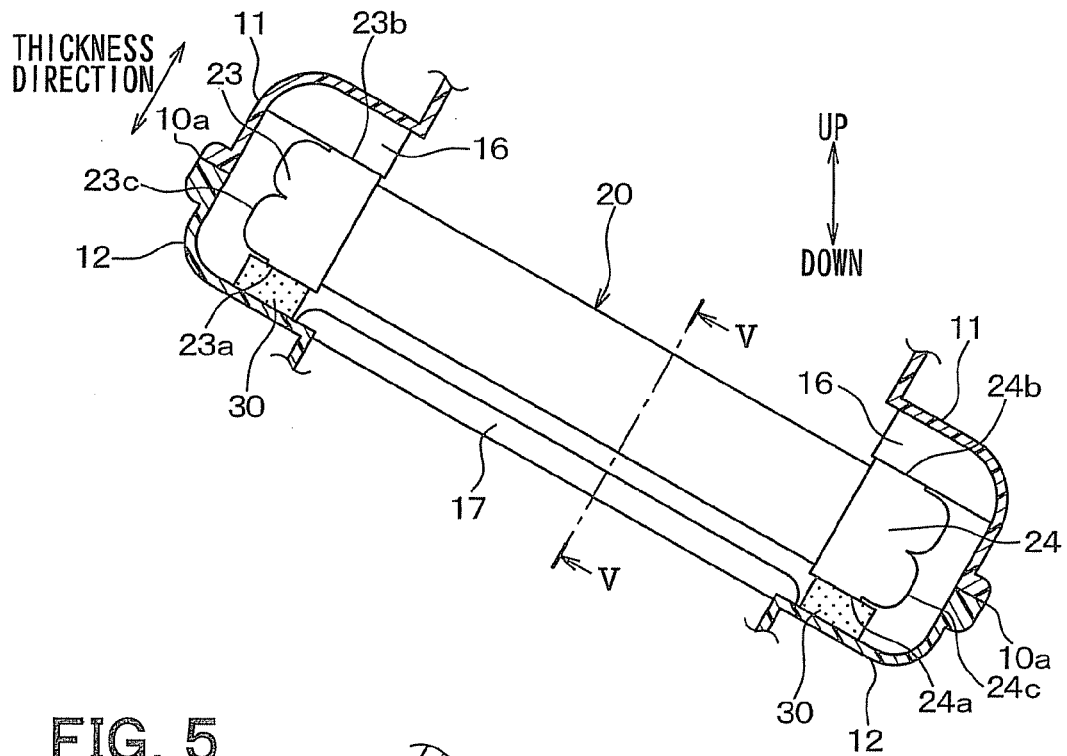
FIG. 4 is a sectional view of the air conditioning unit taken along a line IV-IV in FIG. 2.
Figure 5:
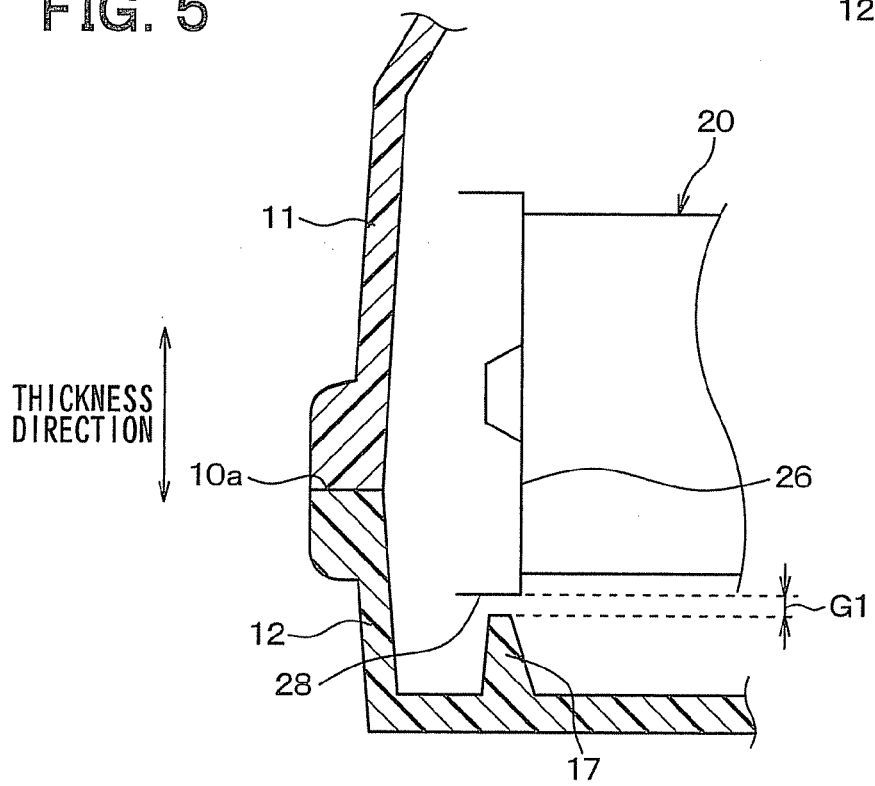
FIG. 5 is a cross-sectional view of the air conditioning unit taken along a line V-V in FIGS. 2 and 4.

As illustrated in FIGS. 4 and 5, a division surface 10a between the first case 11 and second case 12 of the unit case 10 is located at a region of the unit case 10 that holds the evaporator 20. In the present embodiment, as hereinafter described, an outer peripheral part of the evaporator 20 is clamped between the first case 11 and second case 12 in the thickness direction of the evaporator 20, so as to be held in the case 10.

Specifically, as illustrated in FIG. 4, an elastic body 30 is attached on lower surfaces 23a, 24a of the tank parts 23, 24 of the evaporator 20 on one side of the evaporator 20 in its thickness direction, and the elastic body 30 is disposed between the tank parts 23, 24 and the second case 12.

On the other hand, the elastic body 30 is not attached on upper surfaces 23b, 24b of the tank parts 23, 24 on the other side of the evaporator 20 in its thickness direction, and the upper surfaces 23b, 24b of the tank parts 23, 24 are held directly by a holding portion 16 formed on the first case 11.

As illustrated in FIGS. 3 and 4, the elastic body 30 is not attached on side surfaces 23c, 24c of the tank parts 23, 24 on both sides of the evaporator 20 in its height direction or on side surfaces 23d, 24d of the tank parts 23, 24 on both sides of the evaporator 20 in its width direction.

The elastic body 30 is compressively deformed by stress for clamping the evaporator 20 by the unit case 10, and is a packing which is formed from a urethane foamed material. Besides the urethane foamed material, a member formed from, for example, another foamed material or rubber can be employed for the elastic body 30.

The elastic body 30 is disposed on a part of the outer peripheral part of the evaporator 20. In the present embodiment, as illustrated in FIG. 2, the elastic bodies 30 are disposed on both end sides of the tank parts 23, 24 in their longitudinal direction, and arranged at four places of the outer peripheral part of the evaporator 20.

The holding portion 16 is a rib projecting partly from an inner wall of the first case 11, and is integrally formed from the same material as the first case 11. In the present embodiment, the rib serving as the holding portion 16 extends linearly in a direction perpendicular to the longitudinal direction of the tank parts 23, 24, and top parts of the ribs are in line contact with the upper surfaces 23b, 24b of the tank parts 23, 24.

The holding portions 16 are formed at positions of the case 11 corresponding to the elastic body 30 in the thickness direction of the evaporator 20. In the present embodiment, as illustrated in FIG. 2, the holding portions 16 are arranged at four positions of a region of the case 11 opposed to the outer peripheral part of the evaporator 20.

As illustrated in FIGS. 4 and 5, a portion of the outer peripheral part of the evaporator 20, on which the elastic body 30 is not disposed, has a structure for limiting an air leak.

Specifically, as illustrated in FIG. 5, a planar portion 28 is formed on a lower side of the side plate 26 located at the outer peripheral part of the evaporator 20, which is on one side of the evaporator 20 in its thickness direction. Although not shown in FIG. 5, the planar portion 28 is formed similarly on the side plate 25. An air stop rib 17 is formed at a position of the second case 12 opposed to the planar portion 28 in the thickness direction of the evaporator 20.

The air stop rib 17 projects partly from an inner wall of the second case 12, and is formed integrally from the same material as the first case 11. This air stop rib 17 is a proximity portion of the case 12 located adjacent to the planar portion 28 of the evaporator 20 to limit an air leak. In the present embodiment, a minute gap G1, which can restrain an air leak, is formed between the rib 17 and the planar portion 28 of the evaporator 20. A size of this gap G1 may be determined suitably according to the size of the evaporator 20, for example.

As illustrated in FIGS. 2 and 4, the air stop rib 17 is formed along the whole region of the side plate 26 in its longitudinal direction, adjacent to the side plate 26 at the outer peripheral part of the evaporator 20, on which the elastic body 30 is not attached.

As illustrated in FIG. 2, for the tank parts 23, 24 on the outer peripheral part of the evaporator 20, the air stop ribs 17 are provided between the elastic body 30 and the elastic body 30 located on both end sides of the tank parts 23, 24 in their longitudinal direction. Part of the lower surfaces 23a, 24a of the tank parts 23, 24 serves as planar portions opposed to the air stop ribs 17.

The attachment of the evaporator 20 to the unit case 10 will be described.

As illustrated in FIG. 3, the evaporator 20, on which the elastic body 30 is attached, is prepared. Then, as illustrated in FIG. 2, the evaporator 20 is positioned at the position of the case 10 at which the unit case 10 is divided between the first case 11 and second case 12, and the first and second cases 11, 12 are brought into contact.

Accordingly, the evaporator 20 is held by the unit case 10 between the first case 11 and second case 12 in the thickness direction of the evaporator 20. In this state, the elastic body 30 is compressed when the evaporator 20 is clamped between the first and second cases 11, 12, and the evaporator 20 is pressed on the holding portion 16 by repulsive force of the elastic body 30 generated as reaction against the compression of the elastic body 30.

The main characteristics of the air conditioning unit 1 of the present embodiment will be described.

In the present embodiment, at the portion of the outer peripheral part of the evaporator 20, on which the elastic body 30 is not disposed, the planar portion 28 is formed on the outer peripheral part of the evaporator 20; and the air stop rib 17, which defines the minute gap G1 between the rib 17 and this planar portion 28, is provided for the unit case 10. As a result, an air leak between the evaporator 20 and the unit case 10 is limited.

Unlike the present embodiment, if the elastic bodies 30 are disposed on both sides of the evaporator 20 in the thickness direction of the evaporator 20, due to the variation in thickness of the elastic body 30 and variation in the amount of compressive deformation of the elastic body 30, the position of the evaporator 20 inside the unit case 10 in the thickness direction of the evaporator 20 changes, and the size of the gap G1 between the planar portion 28 of the evaporator 20 and the air stop rib 17 thereby fluctuates. For this reason, even if the gap G1 between both the parts is designed at such a distance as to limit the air leak, the gap G1 may become large, so that the air leak cannot be limited after the attachment of the evaporator 20 to the unit case 10.

In the present embodiment, the elastic body 30 is disposed only on one side of the evaporator 20 in the thickness direction of the evaporator 20, and the other side of the evaporator 20 in the thickness direction of the evaporator 20 is held directly by the holding portion 16, which is formed on the first case 11. This holding portion 16 is a part of first cases 11, and has such strength as to not compressively deform by stress applied at the time of its attachment.

Consequently, the evaporator 20 is pressed against the holding portion 16 at the time of the attachment, and the evaporator 20 is thereby positioned by the holding portion 16. Therefore, the change of the position of the evaporator 20 inside the unit case 10 can be eliminated. Hence, in the present embodiment, if the thickness of the evaporator 20 has a desired size, the gap G1 between the planar portion 28 of the evaporator 20 and the air stop rib 17 can be mad stable, thereby reliably limiting the air leak.

In the present embodiment, even in the case of variation of the size of thickness of the evaporator 20, the size of the gap G1 can be stabilized within such a range as to limit the air leak by setting the gap G1 in view of the variation of the size of thickness of the evaporator 20.

In the present embodiment, the planar portion 28 of the evaporator 20 and the air stop rib 17 are opposed to each other in the thickness direction of the evaporator 20.

Accordingly, even if a position misalignment of the evaporator 20 is caused in the width direction or height direction of the evaporator 20, the size of the gap G1 between the planar portion 28 of the evaporator 20 and the air stop rib 17 does not change. Through this as well, in the present embodiment, the gap G1 between the planar portion 28 of the evaporator 20 and the rib 17 can be made stable, thereby reliably limiting the air leak.

In addition, a formation range for the planar portion 28 of the evaporator 20 may preferably be broader than a formation range for the air stop rib 17, so that the planar portion 28 of the evaporator 20 and the air stop rib 17 are opposed to each other even if the position shift of the evaporator 20 is made in the width direction or height direction of the evaporator 20.

In the present embodiment, in the thickness direction of the evaporator 20, one side of the evaporator 20 is held by the elastic body 30, and the other side of the evaporator 20 is held by the holding portion 16. Furthermore, the planar portion 28 of the evaporator 20 and the air stop rib 17 are opposed to each other in the thickness direction of the evaporator 20. As a result, a parts management value can be limited to a single direction, which is advantageous in component structure and in cost.

More specifically, in the present embodiment, the size of the gap G1 between the planar portion 28 of the evaporator 20 and the air stop rib 17 is set at a constant value. Consequently, all the sizes of thickness of the evaporator 20, thickness of the elastic body 30, height of the holding portion 16, and height of the air stop rib 17 can be regulated in the same direction, so that dimensional management is further facilitated than the case of dimensional control in two or three directions.

In the present embodiment, the elastic body 30 is disposed on the one side of the evaporator 20 in the thickness direction of the evaporator 20. Hence, the evaporator 20 can be held by the repulsive force of the elastic body 30 against its compressive deformation in the thickness direction of the evaporator 20. Therefore, a backlash of the evaporator 20 can be limited.

In the present embodiment, the holding portion 16 formed on the first case 11 is in direct contact with the evaporator 20. Thus, vibration of the evaporator 20 due to expansion and contraction of the refrigerant, for example, is transmitted to the unit case 10.

Nevertheless, in the present embodiment, a range of contact of the evaporator 20 with the holding portion 16 is not the entire outer peripheral part of the evaporator 20, but is a part of this outer peripheral part. Accordingly, as compared with the case of direct contact of the entire outer peripheral part of the evaporator 20 with the unit case 10, vibration transmission from the evaporator 20 to the unit case 10 can be mitigated.

Moreover, in the present embodiment, the holding portion 16 is formed from a linearly-extending rib, and the holding portion 16 and the upper surfaces 23b, 24b of the tank parts 23, 24 are in line contact. As a result, the vibration transmission from the evaporator 20 to the unit case 10 can be mitigated in comparison to the case of surface contact of both the members. In addition, a shape of the holding portion 16 may be changed such that the contact between the holding portion 16 and the upper surfaces 23b, 24b is a point contact instead of the line contact.

In the present embodiment, only a part of the outer peripheral part of the evaporator 20 is in contact with the elastic body 30 and the holding portion 16, and a portion of the outer peripheral part of the evaporator 20, on which the elastic body 30 is not attached, is not in contact with any components. Although the elastic body 30 has an effect of vibration reduction, the vibration is transmitted to the unit case 10 through the elastic body 30 when the elastic body 30 is disposed between the evaporator 20 and the unit case 10. In the present embodiment, an area of indirect or direct contact of the evaporator 20 with the unit case 10 is smaller than the case of arrangement of the elastic body 30 on the entire outer peripheral part of the evaporator 20. Consequently, the effect of alleviating the vibration transmission is great.

In the present embodiment, the elastic body 30 is not arranged on the whole region of the outer peripheral part of the evaporator 20, and the elastic body 30 is instead disposed on a part of this outer peripheral part. Therefore, the amount of the elastic body 30 used can be reduced compared to the case of arrangement of the elastic body 30 on the entire region of the outer peripheral part of the evaporator 20.

In the case of arrangement of the elastic body 30 on the entire outer peripheral part of the evaporator 20, if the elastic body 30 is formed from a foamed material, a smell is emanated due to moisture absorption of the elastic body 30 when the air conditioning system is disposed in a vehicle. In addition, the trouble of having to prevent a product defect, such as position misalignment or removal of the elastic body 30 on the evaporator 20 is caused at the time of attachment of the evaporator 20 to the unit case 10, and a quality cost is thereby increased.

In the present embodiment, because of the small amount of the elastic body 30 used compared to the case of arrangement of the elastic body 30 on the entire region of the outer peripheral part of the evaporator 20, the generation of smell due to the moisture absorption can be reduced, and the trouble of having to prevent the product defect, such as the position misalignment or removal of the elastic body 30 can be reduced.

(Second Embodiment)

In the first embodiment, the lower side of the evaporator 20 is held by the elastic body 30, and the upper side of the evaporator 20 is held directly by the holding portion 16 on the case 11-side. Conversely, in the light of a gravity load, the upper side of the evaporator 20 may be held by the elastic body 30, and the lower side of the evaporator 20 may be held directly by the holding portion 16 on the case-side. From the aspect of minimizing the vibration transmission from the evaporator 20 to the unit case 10, the configuration of the air conditioning unit 1 of the first embodiment may be more desirable.

In a second embodiment of the invention, the planar portion 28 is formed on the lower side of the evaporator 20, which is on the same side as the holding portion 16, and the air stop rib 17 is formed at a position of the second case 12 opposed to the planar portion 28.

In the first embodiment, as illustrated in FIG. 4, the elastic body 30 and the air stop rib 17 are both arranged on the lower side of the evaporator 20. Thus, if the evaporator 20 has a size variation in the thickness direction of the evaporator 20, the size of the gap G1 between the air stop rib 17 and the planar portion 28 of the evaporator 20 fluctuates.

By forming the air stop rib 17 on the same side as the holding portion 16, even if the evaporator 20 has the size variation in the thickness direction of the evaporator 20, the position of the planar portion 28 of the evaporator 20 can constantly be fixed at the same position, and the size of the gap G1 between the air stop rib 17 and the planar portion 28 of the evaporator 20 can thereby be stabilized.

Additionally, in the first embodiment, similar to the present embodiment, the air stop rib 17 may be formed on the same side as the holding portion 16.

(Third Embodiment)

In a third embodiment of the invention, a shape of the elastic body 30 is modified to the first embodiment, and this point will be described below.

Figure 6:
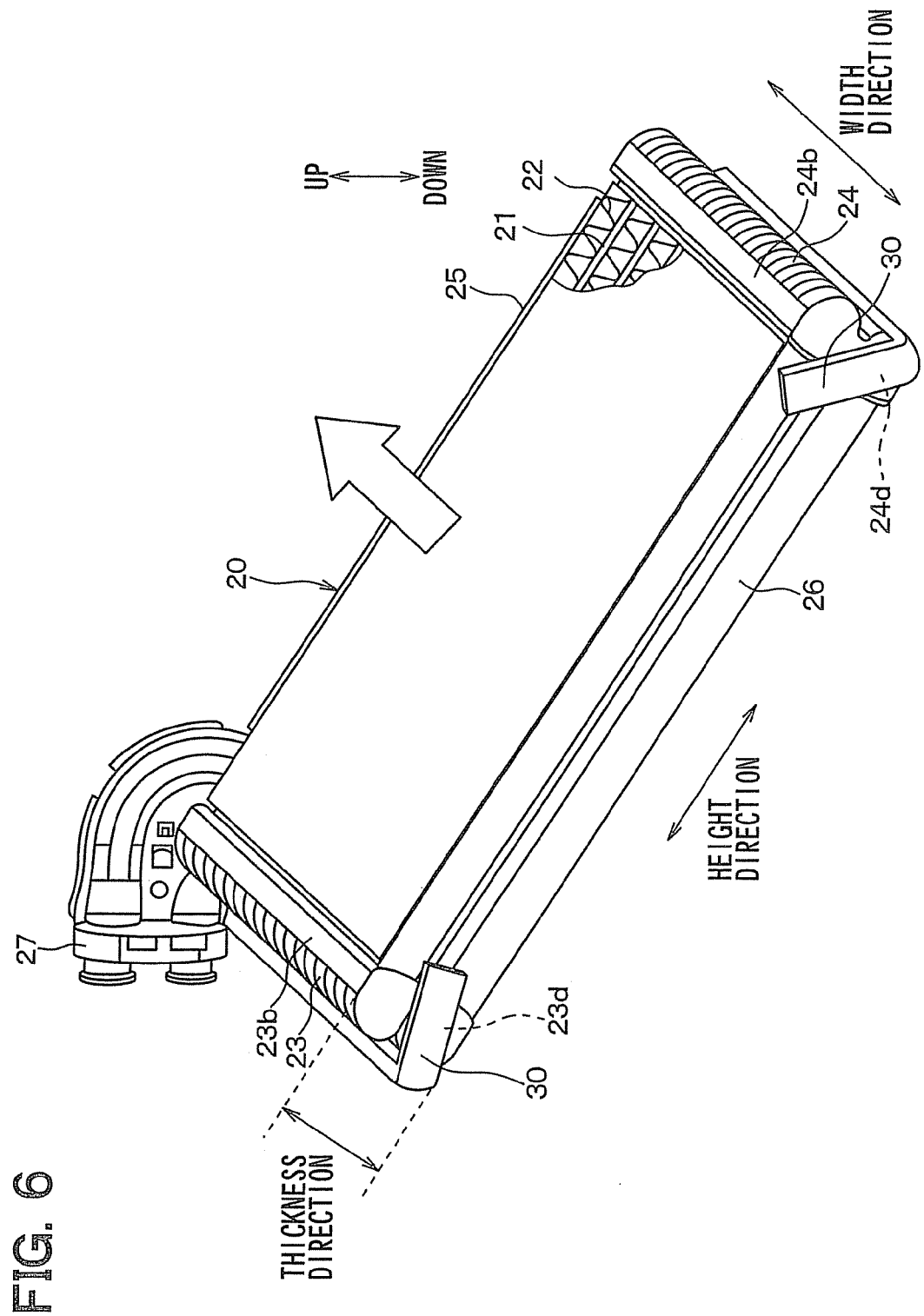
FIG. 6 is a perspective view illustrating an evaporator in accordance with a third embodiment of the invention.
Figure 7:
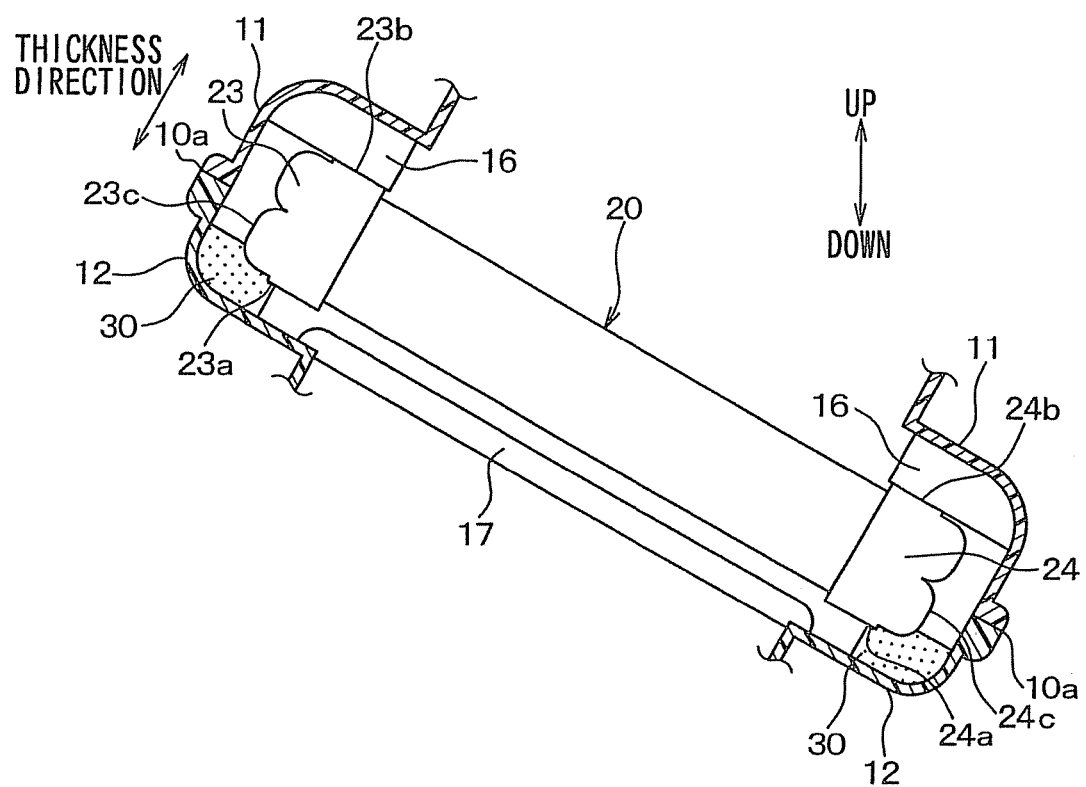
FIG. 7 is a sectional view illustrating an air conditioning unit of the third embodiment.

As illustrated in FIGS. 6 and 7, in the third embodiment, a single rod-shaped elastic body 30 is disposed on a corner part between a lower surface 23a of one tank part 23 and a side surface 23c of the tank part 23 in a height direction of an evaporator 20, entirely in a longitudinal direction of the tank part 23; and a side surface 23d of the tank part 23 in a width direction of the evaporator 20.

Similarly, the single rod-shaped elastic body 30 is disposed on a corner part between a lower surface 24a of the other tank part 24 and a side surface 24c of the tank part 24 in the height direction of the evaporator 20 entirely in a longitudinal direction of the tank part 24; and a side surface 24d of the tank part 24 in the width direction of the evaporator 20.

Accordingly, in the present embodiment, in the height direction and width direction of the evaporator 20 as well as in the thickness direction of the evaporator 20, the evaporator 20 can be pressed and held using the repulsive force of the elastic body 30 at the time of compression of the elastic body 30. Therefore, a backlash of the evaporator 20 can be limited.

In order to obtain holding force for pressing and holding the evaporator 20 in the three directions of the evaporator 20, i.e., the thickness direction, height direction, and width direction, the elastic bodies 30 need to be attached respectively on three surfaces of the lower surfaces 23a, 24a of the tank parts 23, 24; the side surfaces 23c, 24c of the tank parts 23, 24 in the height direction of the evaporator 20; and the side surfaces 23d, 24d of the tank parts 23, 24 in the width direction of the evaporator 20.

In the present embodiment, holding force in the three directions is obtained by means of the single elastic body 30. Consequently, the number of elastic bodies 30 needed can be reduced in comparison to the case of separately attaching the elastic bodies 30 on respective surfaces of the tank parts 23, 24, and the productivity of the unit 1 can thereby be improved.

In the present embodiment, particularly, the elastic body 30 is disposed on the corner part between the lower surface 23a of the tank part 23 and the side surface 23c of the tank part 23 in the height direction of the evaporator 20. As a result, compared with a case of attachment of an elastic body that is bent in an L-shaped manner straddling between the lower surface 23a and the side surface 23c in the height direction of the evaporator 20, an area for the disposition of the elastic body 30 can be made small.

In the present embodiment, the air stop rib 17 is disposed only adjacent to a side plate 26 of the outer peripheral part of the evaporator 20, and the rib 17 is not disposed on the tank parts 23, 24-sides.

Modifications of the above embodiments will be described. In the above-described embodiments, the holding portion 16, which holds the evaporator 20 directly, is a rib projecting partly from the inner wall of the unit case 10. Alternatively, the holding portion 16 may also be a flat inner wall surface. In the above embodiments, the holding portion 16 is formed integrally from the same material as the unit case 10. Alternatively, a component formed separately from the unit case 10 may be fixed on the inner wall of the unit case 10.

Moreover, a rigid-body member disposed inside the unit case 10 may be used for the holding portion 16 which holds the evaporator 20 directly. This rigid-body member means a member that is not compressively deformed by a stress applied when the unit case 10 clamps the evaporator 20. A frame member that supports the sliding-type air mixing door having a shape of a plate may be employed for the rigid-body member. As described above, the component other than the unit case 10 that is located close to the evaporator 20 and that constitutes the air conditioning system for the vehicle can be used for the holding portion 16.

In the above embodiments, the air stop rib 17 projecting partly from the inner wall of the unit case 10 serves as the proximity portion of the case 12 located adjacent to the planar portion 28 of the evaporator 20 to limit the air leak. Instead, the proximity portion of the case 12 may be formed using the flat inner wall surface of the unit case 10.

In the above embodiments, the minute gap G1 that can restrain the air leak is formed between the air stop rib 17, which is the proximity portion of the unit case 10, and the planar portion 28 of the evaporator 20. Instead, the air stop rib 17, which is the proximity portion, and the planar portion 28 of the evaporator 20 may be in contact.

In the above embodiments, the planar portion 28 and the air stop rib 17, which is the proximity portion, are provided on one side of the evaporator 20 in the thickness direction of the evaporator 20. Alternatively, the planar portion 28 and the air stop rib 17, which is the proximity portion, may be provided on both sides of the evaporator 20 in a thickness direction of the heat exchanger.

In the above embodiments, the evaporator 20 includes the tubes 21, the tank parts 23, 24 communicating with both end portions of the tubes 21, and the side plates 25, 26 disposed on both sides of the evaporator 20 in the stacking direction of the tubes 21. The invention can be applied to the case of use of an evaporator having another structure as well.

In the above embodiments, the unit case 10 is divided between the first case 11 and second case 12, and the evaporator 20 is sandwiched between the first case 11 and second case 12. However, the invention is not limited to such a structure. The invention can be applied also to a structure of the unit 1 in which the evaporator 20 is inserted in the unit case 10, as long as the evaporator 20 is sandwiched and held by the unit case 10 in the thickness direction of the evaporator 20.

In the above embodiments, the evaporator 20 is disposed in an inclined manner inside the unit case 10. The invention can be applied also to an air conditioning system for a vehicle, in which an evaporator 20 is vertically disposed or horizontally disposed. In addition, in the case of the vertical disposition of the evaporator 20, a heat exchange surface of the evaporator 20 is parallel to the vertical direction; and in the case of the horizontal disposition of the evaporator 20, the heat exchange surface of the evaporator 20 is parallel to the horizontal direction.

In the above embodiments, the air conditioning unit is divided into the heat exchanger unit and the blower unit. Instead, the air conditioning unit is not divided between the heat exchanger unit and the blower unit, and may be configured as a single air conditioning unit.

In the above embodiments, the invention is applied to the structure for holding the evaporator 20 in the unit case 10. In addition, the invention can be applied also to a structure for holding the heater core, which is a heat exchanger for heating.

The above-described embodiments may be combined within a feasible range.

To sum up, the air conditioning system for the vehicle in accordance with the above-described embodiments of the invention may be described as follows.

The air conditioning system for the vehicle includes a heat exchanger 20, a case 10, and an elastic body 30. The case 10 clamps and holds an outer peripheral part of the heat exchanger 20 at least in a thickness direction of the heat exchanger 20. The elastic body 30 is disposed at a part of the outer peripheral part of the heat exchanger 20 between the case 10 and the heat exchange 20 on one side of the heat exchanger 20 in the thickness direction of the heat exchanger 20. The other side of the heat exchanger 20 in the thickness direction of the heat exchanger 20 is held directly by the case 10. A region of the outer peripheral part of the heat exchanger 20 except the part of the outer peripheral part of the heat exchanger 20 includes a planar portion 28 at least on one of both sides of the heat exchanger 20 in the thickness direction of the heat exchanger 20. The case 10 includes a proximity portion 17 at a position of the case 10 opposed to the planar portion 28 in the thickness direction of the heat exchanger 20. The proximity portion 17 is located adjacent to the planar portion 28 to limit an air leak. Alternatively, the air conditioning system for the vehicle includes a heat exchanger 20, a case 10, an elastic body 30, and a rigid member. The case 10 clamps and holds an outer peripheral part of the heat exchanger 20 at least in a thickness direction of the heat exchanger 20. The elastic body 30 is disposed at a part of the outer peripheral part of the heat exchanger 20 between the case 10 and the heat exchanger 20 on one side of the heat exchanger 20 in the thickness direction of the heat exchanger 20. The rigid member directly holds the other side of the heat exchanger 20 in the thickness direction of the heat exchanger 20. A region of the outer peripheral part of the heat exchanger 20 except the part of the outer peripheral part of the heat exchanger 20 includes a planar portion 28 at least on one of both sides of the heat exchanger 20 in the thickness direction of the heat exchanger 20. The case 10 includes a proximity portion 17 at a position of the case 10 opposed to the planar portion 28 in the thickness direction of the heat exchanger 20. The proximity portion 17 is located adjacent to the planar portion 28 to limit an air leak.

Accordingly, the heat exchanger 20 includes the planar portion 28 at a portion of the outer peripheral part of the heat exchanger 20, on which the elastic body 30 is not disposed; and the proximity portion 17 located adjacent to this planar portion 28 to limit an air leak is formed on the case 10. As a result, the air leak between the heat exchanger 20 and the case 10 can be limited. The proximity portion 17 of the case 10 being adjacent to the planar portion 28 of the heat exchanger 20 means that the portion 17 is in contact with the planar portion 28 or that a minute gap G1 is formed between the portion 17 and the planar portion 28.

If the elastic bodies 30 are disposed on both sides of the heat exchanger 20 in the thickness direction of the heat exchanger 20, the position of the heat exchanger 20 changes inside the case 10 in the thickness direction of the heat exchanger 20 due to the variation in thickness of the elastic body 30 and variation in the amount of compressive deformation of the elastic body 30. Consequently, a distance between the planar portion 28 of the heat exchanger 20 and the proximity portion 17 of the case 10 fluctuates. Therefore, even if the distance between both the parts is designed at such a distance as to limit the air leak, the distance between both the parts may become large, so that the air leak cannot be limited after the attachment of the heat exchanger 20 to the case 10.

In the invention, the elastic body 30 is disposed only on one side of the heat exchanger 20 in the thickness direction of the heat exchanger 20, and the other side of the heat exchanger 20 in the thickness direction of the heat exchanger 20 is held directly by the case 10 or another rigid-body member. Thus, fluctuation of the position of the heat exchanger 20 inside the case 10 can be eliminated. As a result of the invention, the distance between the planar portion 28 of the heat exchanger 20 and the proximity portion 17 can be stabilized, thereby reliably limiting the air leak.

In the invention, the elastic body 30 is disposed on one side of the heat exchanger 20 in the thickness direction of the heat exchanger 20. As a result, at least in the thickness direction of the heat exchanger 20, the heat exchanger 20 can be pressed, and a backlash of the heat exchanger 20 can thereby be prevented using the repulsive force of the elastic body 30 against the compressive deformation of the elastic body 30.

Moreover, in the invention, a range of the heat exchanger 20 with which the case 10 or another rigid-body member is in direct contact is not the entire region of the outer peripheral part of the heat exchanger 20. Consequently, the vibration transmission from the heat exchanger 20 to the case 10 can be reduced in comparison to the case of direct contact of the entire region of the outer peripheral part of the heat exchanger 20 with the case 10.

Hence, as a consequence of the invention, there is provided the air conditioning system for the vehicle that can accomplish the above-described three purposes of the use of the elastic body 30 and that can reduce the used amount of the elastic body 30 as compared to the case of arrangement of the elastic body 30 on the whole region of the outer peripheral part of the heat exchanger 20.

The proximity portion 17 may be formed integrally with the case 10 and may be a rib 17 projecting partly from an inner wall of the case 10.

The planar portion 28 and the proximity portion 17 may be formed on the one side of the heat exchanger 20 in the thickness direction of the heat exchanger 20. The planar portion 28 and the proximity portion 17 may be formed on the other side of the heat exchanger 20 in the thickness direction of the heat exchanger 20.

Accordingly, by forming the proximity portion 17 on a certain side of the case 10, on which the heat exchanger 20 is held directly by the case 10 or another rigid-body member, the distance between the proximity portion 17 of the case 10 and the planar portion 28 of the heat exchanger 20 can constantly be made the same despite a size variation of the heat exchanger 20 in the thickness direction of the heat exchanger 20.

The heat exchanger 20 may include a plurality of tubes 21 that are stacked; tank parts 23, 24 that are disposed on both sides of the plurality of tubes 21 in a longitudinal direction thereof; and side plates 25, 26 that are disposed on both sides of the plurality of tubes 21 in a stacking direction thereof. The elastic body 30 may be disposed entirely along the tank parts 23, 24 in longitudinal directions of the tank parts 23, 24. The planar portion 28 and the proximity portion 17 may be formed entirely along the side plates 25, 26 in longitudinal directions thereof except where the elastic body 30 is disposed.

Additional advantages and modifications will readily occur to those skilled in the art. The invention in its broader terms is therefore not limited to the specific details, representative apparatus, and illustrative examples shown and described.

What is claimed is:

1. An air conditioning system for a vehicle, comprising:
a heat exchanger having an upper tank part disposed at an upper end of the heat exchanger, a lower tank part disposed at a lower end of the heat exchanger and a plurality of tubes extending between the upper tank part and the lower tank part;
a case that clamps and holds an outer peripheral part of the lower end of the heat exchanger at least in a thickness direction of the heat exchanger; and
a lower elastic body that is disposed at the lower end of the heat exchanger at a part of the outer peripheral part of the lower end of the heat exchanger between the case and the lower end of the heat exchanger on a first side of the heat exchanger in the thickness direction of the heat exchanger, wherein:
a second side of the heat exchanger in the thickness direction of the heat exchanger opposite to the first side at the lower end of the heat exchanger is held directly by the case such that the second side of the lower end of the heat exchanger is in direct contact with the case;
the lower elastic body is compressively deformed by stress, with which the case clamps the outer peripheral part of the lower end of the heat exchanger;
a region of the outer peripheral part of the lower end of the heat exchanger includes a planar portion at least on the first side of the heat exchanger;
the case includes a proximity portion at a position of the case opposed to the planar portion in the thickness direction of the heat exchanger; and
the proximity portion is located adjacent to the planar portion to limit an air leak.

2. The air conditioning system according to claim 1, wherein the proximity portion is formed integrally with the case and is a rib projecting partly from an inner wall of the case.

3. The air conditioning system according to claim 1, wherein the planar portion and the proximity portion are formed on the first side of the heat exchanger in the thickness direction of the heat exchanger.

4. The air conditioning system according to claim 1, wherein the planar portion and the proximity portion are formed on the second side of the heat exchanger in the thickness direction of the heat exchanger.

5. The air conditioning system according to claim 1, wherein:
the heat exchanger includes:
side plates that are disposed on both sides of the plurality of tubes in a stacking direction thereof;
the lower elastic body is disposed entirely along the lower tank part in a longitudinal direction of the lower tank part; and
the planar portion and the proximity portion are formed entirely along the side plates in longitudinal directions thereof except where the lower elastic body is disposed.

6. The air conditioning system according to claim 1, wherein the thickness direction of the heat exchanger is parallel to air flow through the heat exchanger.

7. The air conditioning system according to claim 1, further comprising:
an upper elastic body that is disposed at the upper end of the heat exchanger at a part of an outer peripheral part of the heat exchanger between the case and the upper end of the heat exchanger at the first side of the heat exchanger;

the second side of the heat exchanger at the upper end of the heat exchanger is held directly by the case such that the second side of the upper end of the heat exchanger is in direct contact with the case;

the upper elastic body is compressively deformed by stress, with which the case clamps the outer peripheral part of the upper end of the heat exchanger.

8. An air conditioning system for a vehicle, comprising:

a heat exchanger having an upper tank part disposed at an upper end of the heat exchanger, a lower tank part disposed at a lower end of the heat exchanger, a plurality of tubes extending between the upper tank part and the lower tank part and an outer peripheral part, wherein the outer peripheral part has a first side and a second side opposite the first side in a thickness direction of the heat exchanger;

a case that clamps and holds the outer peripheral part of the lower end of the heat exchanger at least in the thickness direction of the heat exchanger;

a lower elastic body that is disposed at the lower end of the heat exchanger at a portion of the first side of the outer peripheral part of the heat exchanger such that the lower elastic body is positioned between the case and the heat exchanger; and a rigid member that is disposed at the lower end of the heat exchanger inside the case directly holds the second side of the outer peripheral part of the lower end of the heat exchanger, the case with the rigid member clamps the outer peripheral part of the lower end of the heat exchanger, wherein:

the lower elastic body is compressively deformed by stress;

a region of the outer peripheral part of the heat exchanger at the lower end of the heat exchanger includes a planar portion at least on the first side of the outer peripheral part, the region with the planar portion does not have the lower elastic body disposed thereon;

the case includes a proximity portion at a position of the case opposed to the planar portion in the thickness direction of the heat exchanger; and the proximity portion is located adjacent to the planar portion to limit an air leak.

9. The air conditioning system according to claim 8, wherein the proximity portion is formed integrally with the case and is a rib projecting partly from an inner wall of the case.

10. The air conditioning system according to claim 8, wherein the planar portion and the proximity portion are formed on the first side of the heat exchanger in the thickness direction of the heat exchanger.

11. The air conditioning system according to claim 8, wherein the planar portion and the proximity portion are formed on the second side of the heat exchanger in the thickness direction of the heat exchanger.

12. The air conditioning system according to claim 8, wherein:

the heat exchanger includes:

side plates that are disposed on both sides of the plurality of tubes in a stacking direction thereof;

the lower elastic body is disposed entirely along the lower tank part in a longitudinal direction of the lower tank part; and the planar portion and the proximity portion are formed entirely along the side plates in longitudinal directions thereof except where the lower elastic body is disposed.

13. The air conditioning system according to claim 8, wherein the thickness direction of the heat exchanger is parallel to air flow through the heat exchanger.

14. The air conditioning system according to claim 8, further comprising:

an upper elastic body that is disposed at the upper end of the heat exchanger at a part of an outer peripheral part of the heat exchanger between the case and the upper end of the heat exchanger at the first side of the heat exchanger;

the second side of the heat exchanger at the upper end of the heat exchanger is held directly by the case such that the second side of the upper end of the heat exchanger is in direct contact with the case;

the upper elastic body is compressively deformed by stress, with which the case clamps the outer peripheral part of the upper end of the heat exchanger.

15. An air conditioning system for a vehicle, the air conditioning system comprising:

a heat exchanger having an upper tank part disposed at an upper end of the heat exchanger, a lower tank part disposed at a lower end of the heat exchanger, a plurality of tubes extending between the upper tank part and the lower tank part and an outer peripheral part at the lower end of the heat exchanger, wherein the outer peripheral part of the lower end of the heat exchanger has a first surface at the lower end of the heat exchanger and a second surface opposite to the first surface at the lower end of the heat exchanger in a thickness direction of the heat exchanger;

a case that clamps and holds the lower end of the heat exchanger in the thickness direction of the heat exchanger;

a lower elastic body disposed at the lower end of the heat exchanger directly between the first surface of the heat exchanger and a first surface of the case, wherein a second surface of the case opposite to the first surface of the case in the thickness direction directly contacts the second surface of the heat exchanger at the lower end of the heat exchanger;

the lower elastic body is compressively deformed to clamp the heat exchanger;

the first surface of the heat exchanger includes a planar portion; and an air stop rib is located adjacent the planar portion to limit an air leak.

16. The air conditioning system according to claim 15, wherein the air stop rib is formed integrally with the case and projects from an inner wall of the case.

17. The air conditioning system according to claim 15, wherein:

the heat exchanger includes:

side plates that are disposed on both sides of the plurality of tubes in a stacking direction thereof;

the lower elastic body is disposed entirely along the lower tank part in a longitudinal direction of the lower tank part; and the planar portion and the air stop rib are formed entirely along the side plates in longitudinal directions thereof except where the lower elastic body is disposed.

18. The air conditioning system according to claim 1, wherein the first surface of the heat exchanger is parallel to the second surface of the heat exchanger.

19. The air conditioning system according to claim 18, wherein the first and second surfaces of the heat exchanger are located on the lower tank part of the heat exchanger.

20. The air conditioning system according to claim 15, wherein the thickness direction of the heat exchanger is parallel to air flow through the heat exchanger.

21. The air conditioning system according to claim 15, further comprising:
- an upper elastic body that is disposed at the upper end of the heat exchanger at a first surface of an outer peripheral part of the upper end of the heat exchanger between the case and the upper end of the heat exchanger;
- a second surface of the outer peripheral part of the upper end of the heat exchanger at the upper end of the heat exchanger opposite to the first surface is held directly by the case such that the second surface of the upper end of the heat exchanger is in direct contact with the case;
- the upper elastic body is compressively deformed by stress, with which the case clamps the outer peripheral part of the upper end of the heat exchanger.

* * * * *